United States Patent
Olenik et al.

(10) Patent No.: US 12,000,743 B2
(45) Date of Patent: Jun. 4, 2024

(54) SAFEGUARDING EQUIPMENT BASED ON DETECTION OF REDUCED CYCLICAL PUMP PERFORMANCE

(71) Applicant: Textron Systems Corporation, Hunt Valley, MD (US)

(72) Inventors: Thomas Edward Olenik, Glen Rock, PA (US); Richard Wolfgang Horn, Red Lion, PA (US)

(73) Assignee: Textron Systems Corporation, Hunt Valley, MD (US)

( * ) Notice: Subject to any disclaimer, the term of this patent is extended or adjusted under 35 U.S.C. 154(b) by 602 days.

(21) Appl. No.: 17/071,439

(22) Filed: Oct. 15, 2020

(65) Prior Publication Data

US 2021/0116321 A1 Apr. 22, 2021

Related U.S. Application Data

(60) Provisional application No. 62/924,441, filed on Oct. 22, 2019.

(51) Int. Cl.
*G01L 19/12* (2006.01)
*B64C 39/02* (2023.01)
(Continued)

(52) U.S. Cl.
CPC ............ *G01L 19/12* (2013.01); *B64C 39/024* (2013.01); *F01M 1/02* (2013.01); *F01M 1/16* (2013.01);
(Continued)

(58) Field of Classification Search
CPC ...... F04C 14/08; F04C 2270/80; F04B 51/00; G01L 19/12; B64C 39/024; G08G 5/0056;
(Continued)

(56) References Cited

U.S. PATENT DOCUMENTS 4,054,117 A * 10/1977 Palmer .................... F02P 11/02
123/198 D
4,159,012 A 6/1979 Marino et al.
(Continued)

FOREIGN PATENT DOCUMENTS

DE 102007000314 A1 * 1/2008 .......... F02D 41/221
EP 0828062 A2 3/1998

*Primary Examiner* — Logan M Kraft
*Assistant Examiner* — Joshua Campbell
(74) *Attorney, Agent, or Firm* — BainwoodHuang (57) ABSTRACT

A technique of safeguarding equipment involves deriving a pressure pulse amplitude based on operation of a pump of the equipment, and performing a comparison operation that compares the pressure pulse amplitude value to a predefined threshold. The technique further involves performing, in response to a result of the comparison operation indicating that the pressure pulse amplitude value has fallen below the predefined threshold, a remedial activity to prevent damage to the equipment or to prevent endangerment to persons affected by the failure of the equipment. For example, in the case of an unmanned aerial vehicle (UAV), the remedial action may be to transit the UAV from a densely populated area to a rural area where landing may be possible without injuring persons or damaging the UAV.

21 Claims, 4 Drawing Sheets

(51) Int. Cl.
*F01M 1/02* (2006.01)
*F01M 1/16* (2006.01)
*F01M 11/10* (2006.01)
*F02B 61/04* (2006.01)
*G07C 5/08* (2006.01)

(52) U.S. Cl.
CPC .............. *F01M 11/10* (2013.01); *F02B 61/04* (2013.01); *G07C 5/0816* (2013.01)

(58) Field of Classification Search
CPC ........ B60W 60/0023; B60W 60/00186; F01M 1/22; F01M 1/24; F01M 1/26; F01M 1/28
See application file for complete search history.

(56) References Cited

U.S. PATENT DOCUMENTS

| | | | |
|---|---|---|---|
| 4,445,470 A | 5/1984 | Chmielewski | |
| 4,928,390 A | 5/1990 | Gassen et al. | |
| 5,000,664 A * | 3/1991 | Lawless | A61M 5/16831 417/63 |
| 5,009,212 A | 4/1991 | Bishai | |
| 5,337,262 A | 8/1994 | Luthi et al. | |
| 5,542,287 A * | 8/1996 | Powers | G01M 3/2815 340/626 |
| 5,662,081 A | 9/1997 | Ng et al. | |
| 6,185,986 B1 * | 2/2001 | Nelson | G01M 3/2815 73/49.1 |
| 6,571,157 B1 | 5/2003 | Dahlin et al. | |
| 6,712,651 B2 * | 3/2004 | Kanno | F01M 1/24 440/88 L |
| 8,695,411 B2 | 4/2014 | Okazawa et al. | |
| 9,228,571 B2 | 1/2016 | Fenny et al. | |
| 9,817,396 B1 * | 11/2017 | Takayama | G05D 1/0038 |
| 10,137,984 B1 * | 11/2018 | Flick | G08G 5/0086 |
| 10,556,680 B2 | 2/2020 | Fenny et al. | |
| 10,737,786 B2 | 8/2020 | Fenny et al. | |
| 10,864,995 B2 | 12/2020 | Chang et al. | |
| 10,974,843 B2 | 4/2021 | Chang et al. | |
| 2009/0322544 A1 * | 12/2009 | McDowell | F17D 5/06 73/40.5 R |
| 2012/0298083 A1 * | 11/2012 | Howell | F02B 75/243 123/65 R |
| 2016/0090955 A1 * | 3/2016 | Yuasa | F02M 55/04 123/457 |

* cited by examiner

SAFEGUARDING EQUIPMENT BASED ON DETECTION OF REDUCED CYCLICAL PUMP PERFORMANCE

CROSS-REFERENCE TO RELATED APPLICATION

This application claims priority to U.S. Patent Application No. 62/924,441, on file at the United States Patent and Trademark Office (USPTO), having a filing date of Oct. 22, 2019, and having "SAFEGUARDING EQUIPMENT BASED ON DETECTION OF REDUCED CYCLICAL PUMP PERFORMANCE" as a title, the contents and teachings of which are herein incorporated by reference in their entirety.

BACKGROUND

Equipment such as aircraft, motorcycles, other vehicles, and industrial machines may include one or more cyclical pumps to provide fluid to parts of the equipment. For example, a conventional drone may employ an oil injection pump to supply oil to a 2-stroke engine while the 2-stroke engine provides propulsion for drone flight.

SUMMARY

To determine whether the oil injection pump is sufficiently providing oil to the 2-stroke engine of a conventional drone, the oil injection pump may be monitored for motion. Unfortunately, once lack of motion by the oil injection pump is detected, there may not be enough time left to perform remedial activities to save the drone (e.g., to safely land the drone) and catastrophic failure may occur. Oil injection pump failure modes such as foreign object blockage, cavitation, loss of prime, or downstream leaks in the oil system are not detected by a method that simply monitors the motion of the pump. Additionally, simply monitoring for a minimum pressure level in a cyclical pump is unable to detect failure because the pressure alternates between high and low values under normal operation.

In contrast, improved techniques are directed to safeguarding equipment via detection of reduced cyclical pump performance. In particular, pressure pulses from a cyclical pump may be sensed and evaluated to determine whether the cyclical pump is moving fluid as intended by the equipment design. Such evaluation may involve comparing pressure values identifying pulse amplitude to a predefined threshold to identify degradation of pump performance prior to a possible substantial failure. Such detection of pressure pulse amplitude decay may provide an accurate diagnosis of eventual equipment failure, but leave time for taking remedial action such as securing and/or shutting down the equipment safely before the cyclical pump fails outright.

One embodiment is directed to a method of safeguarding equipment, e.g., machinery that is lubricated via a cyclical oil pump. The method includes deriving a pressure pulse amplitude value based on operation of a pump of the equipment, and performing a comparison operation that compares the pressure pulse amplitude value to a predefined threshold. The method further includes performing, in response to a result of the comparison operation indicating that the pressure pulse amplitude value has fallen below the predefined threshold, a remedial activity to prevent damage to the equipment or to prevent endangerment to persons affected by the failure of the equipment. For example, in the case of an aircraft, the remedial action may be to transit from a densely populated area to a rural area where landing may be possible without injuring persons or damaging the aircraft.

Another embodiment is directed to electronic circuitry to safeguard equipment. The electronic circuitry includes memory and control circuitry coupled to the memory. The memory stores instructions which, when carried out by the control circuitry, cause the control circuitry to:
  (A) derive a series of pressure values by oversampling of pressure values at the outlet of a pump of the equipment during each period of time encompassing at least one complete pump cycle,
  (B) store the series of pressure values in memory,
  (C) determine the minimum and maximum pressure values within the stored series of pressure values,
  (C) derive the pressure pulse amplitude by subtracting the minimum pressure value from the maximum pressure value,
  (D) perform a comparison operation that compares the pressure pulse amplitude value to a predefined threshold, and
  (E) in response to a result of the comparison operation indicating that the pressure pulse amplitude value has fallen below the predefined threshold, perform a remedial activity to save the equipment.

Another embodiment is directed to an aircraft which includes an airframe, an engine mounted to the airframe to provide thrust for aircraft flight, a pump coupled with the engine, a pressure sensor coupled with the outlet of the pump, and a controller coupled with the pressure sensor. The controller is constructed and arranged to:
  (A) derive a series of pressure values by oversampling of pressure values at the outlet of a pump of the equipment during each period of time encompassing at least one complete pump cycle,
  (B) store the series of pressure values in memory,
  (C) determine the minimum and maximum pressure values within the stored series of pressure values,
  (C) derive the pressure pulse amplitude by subtracting the minimum pressure value from the maximum pressure value,
  (D) perform a comparison operation that compares the pressure pulse amplitude value to a predefined threshold, and
  (E) in response to a result of the comparison operation indicating that the pressure pulse amplitude value has fallen below the predefined threshold, perform a remedial activity to save the equipment.

Yet another embodiment is directed to a computer program product having a non-transitory computer readable medium which stores a set of instructions to safeguard equipment. The set of instructions, when carried out by computerized circuitry, causes the computerized circuitry to perform a method of:
  (A) derive a series of pressure values by oversampling of pressure values at the outlet of a pump of the equipment during each period of time encompassing at least one complete pump cycle,
  (B) store the series of pressure values in memory,
  (C) determine the minimum and maximum pressure values within the stored series of pressure values,
  (C) derive the pressure pulse amplitude by subtracting the minimum pressure value from the maximum pressure value,
  (D) perform a comparison operation that compares the pressure pulse amplitude value to a predefined threshold, and (E) in response to a result of the comparison operation indicating that the pressure pulse amplitude value has fallen below the predefined threshold, perform a remedial activity to save the equipment.

In some arrangements, deriving the pressure pulse amplitude value based on operation of the pump includes receiving pressure readings from a pressure sensor that senses pressure provided by the pump and, based on the pressure readings, generating an amplitude signal representing amplitude of the pressure (e.g., pulse amplitude) provided by the pump.

In some arrangements, the pump is constructed and arranged to provide a cyclical pumping action to produce a series of pressure pulses. For example, the pump may be a solenoid-style pump. Additionally, receiving the pressure readings from the pressure sensor includes sampling readings from the pressure sensor at a sufficiently high frequency to capture a maximum pressure reading and a minimum pressure reading during each pumping action cycle.

In some arrangements, generating the amplitude signal representing amplitude of the pressure provided by the pump includes subtracting a lowest pressure reading from a highest pressure reading during each pumping action cycle to provide the pressure pulse amplitude signal.

In some arrangements, the equipment is an aircraft such as an unmanned aerial vehicle (UAV). Additionally, the pump is an oil injection pump for a 2-stroke engine of the UAV. The 2-stroke engine is constructed and arranged to drive a propeller for UAV flight.

In some arrangements, performing the remedial activity includes outputting an alert to a user on the ground who is remotely piloting the UAV to enable the user to land the UAV in a safe area before the UAV loses power sufficient for flight. Such a feature may save the aircraft as well as prevent injury to persons on the ground.

In some arrangements, performing the remedial activity includes executing an automated landing procedure to land the aircraft before the aircraft loses power sufficient for flight. Such a feature alleviates the need for user intervention when saving the aircraft.

In some arrangements, the method further includes, prior to performing the comparison operation, performing a threshold adjustment operation that modifies an original threshold to form the predefined threshold. The threshold adjustment operation may be based on a current oil temperature value obtained from a temperature sensor. Accordingly, the predefined threshold may be adjusted to account for changes in fluid viscosity characteristics, and so on.

Other embodiments are directed to apparatus, devices, assemblies, and so on. Some embodiments are directed to various methods, systems, and componentry which are involved in safeguarding equipment such as an aircraft based on detection of reduced cyclical pump performance.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to safeguarding equipment via detection of reduced cyclical pump performance. In particular, pressure pulses from a cyclical pump may be sensed and evaluated to determine whether the cyclical pump is moving fluid as intended by the equipment design. Such evaluation may involve comparing pressure values identifying pulse amplitude to a predefined threshold to identify degradation of pump performance prior to a possible substantial failure. Such detection of pressure pulse amplitude decay may provide an accurate diagnosis of eventual equipment failure, but leave time for taking remedial action such as securing and/or shutting down the equipment safely before the cyclical pump fails outright.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
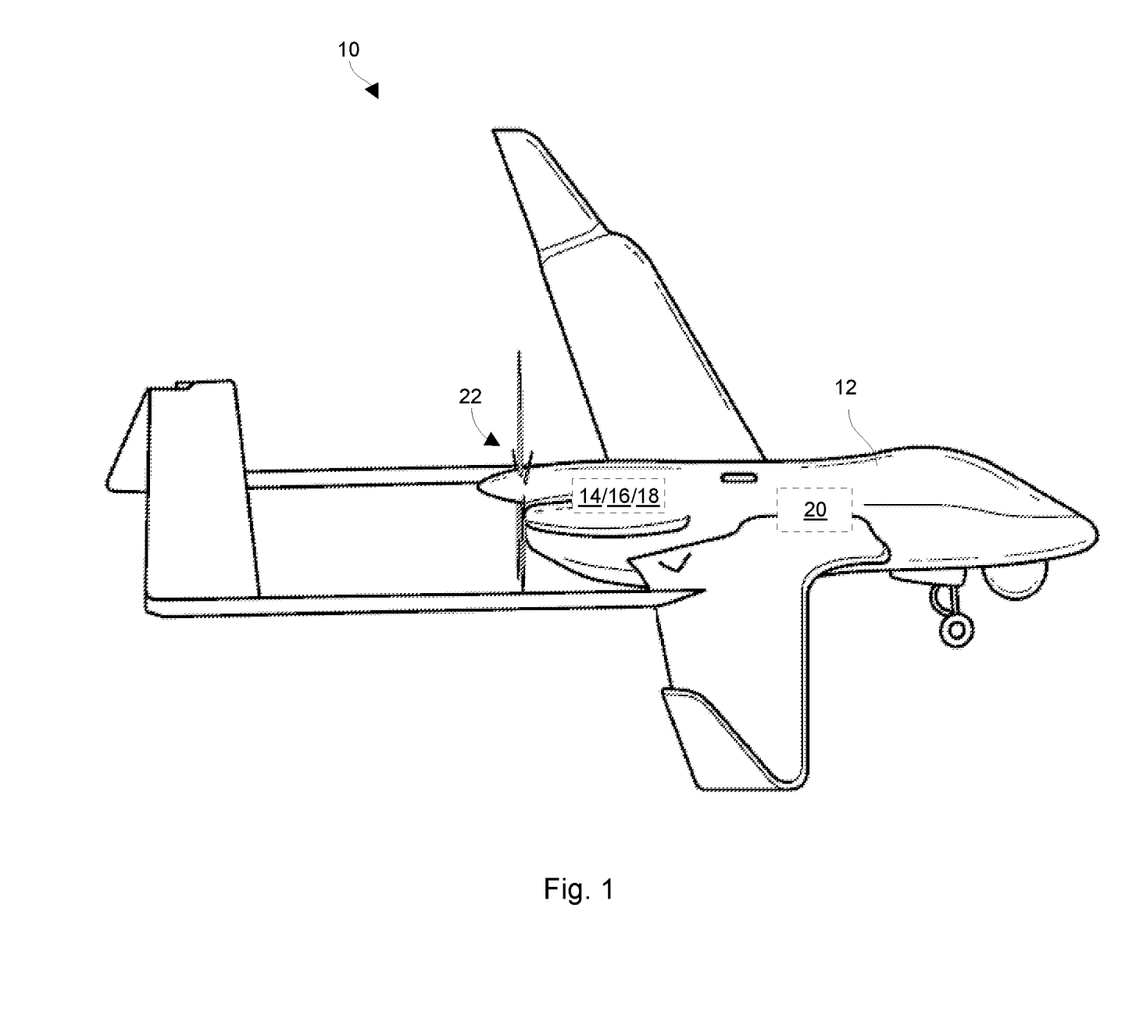
FIG. 1 is a perspective view of an example aircraft which is safeguarded against reduced cyclical pump performance in accordance with certain embodiments.

FIG. 1 shows an aircraft 10 which is safeguarded against reduced cyclical pump performance in accordance with certain embodiments. The aircraft 10 includes an airframe 12, an engine 14, a pump 16, and a controller 18. For illustration purposes, the aircraft 10 has a form factor of an unmanned aerial vehicle (UAV) that transports a payload 20 such as surveillance and/or other sensing equipment (e.g., LIDAR/RADAR, cameras, etc.), munitions, cargo, combinations thereof, and so on.

The airframe 12 is constructed and arranged to support, among other things, the engine 14, the pump 16, the controller 18, the payload 20, etc. The airframe 12 may further provide protection to some or all of these components by shielding/enclosing all of, or portions of, the components.

The engine 14 mounts to the airframe 12 and is constructed and arranged to provide thrust for aircraft flight. In some arrangements, the engine 14 is a 2-stroke combustion engine that drives a propeller 22 for propulsion.

The pump 16 couples with the engine 14 and is constructed and arranged to pump fluid from a fluid source to the engine 14 for proper engine operation. For example, the pump 16 may provide oil under pressure for lubrication and/or cooling purposes. Alternatively, the pump 16 may provide fuel to the engine 14, and so on. In some arrangements, the aircraft 10 includes multiple pumps 16.

The controller 18 couples with the pump 16 and performs a variety of operations such as controlling pump operation, monitoring pump operation, and performing specialized operations in response to detected events. In some arrangements, the controller 18 is capable of communicating with an external base station (e.g., to receive commands from a user on the ground, to relay data, etc.). In some arrangements, the controller 18 is capable of executing a locally stored flight plan (e.g., preloaded prior to takeoff, uploaded and/or updated from the external base station, generated via artificial intelligence, etc.).

During operation, the aircraft 10 takes off to execute a flight plan for a mission. While the aircraft 10 is in flight, the controller 18 performs a variety of operations.

Along the lines, the controller 18 derives a pressure pulse amplitude value based on operation of the pump 16. Additionally, the controller 18 performs a comparison operation that compares the pressure pulse amplitude value to a predefined threshold. Furthermore, the controller 18 may perform remedial activity in response to a result of the comparison operation indicating that the pressure pulse amplitude value has fallen below the predefined threshold. That is, such a result is essentially an early detection signal that provides time to effectively remediate the situation before catastrophic failure occurs. Such remedial activity may involve sending an alert to a user on the ground, flying the aircraft 10 from a densely populated area to a rural area where landing may be possible without injuring persons or damaging the aircraft 10, and so on.

It should be understood that the aircraft 10 may include other componentry which is omitted in FIG. 1 for simplicity. For example, the aircraft 10 may include multiple engines 14 that drive multiple propellers 20. Additionally, the aircraft 10 may include vertical rotors for vertical takeoff and/or landing. Furthermore, the aircraft 10 may include one or more fuel tanks, batteries, parachutes, landing gear, and so on.

It should be further understood that, in accordance with certain embodiments, systems other than an aircraft 10 may be safeguarded via detection of reduced cyclical pump performance. Along these lines, the airframe 12 is merely an example of a support or base structure. Similarly, the engine 14 that turns the propeller 22 is merely an example of equipment that receives fluid from cyclical pump, and so on. Further details will now be provided with reference to FIG. 2.

Figure 2:
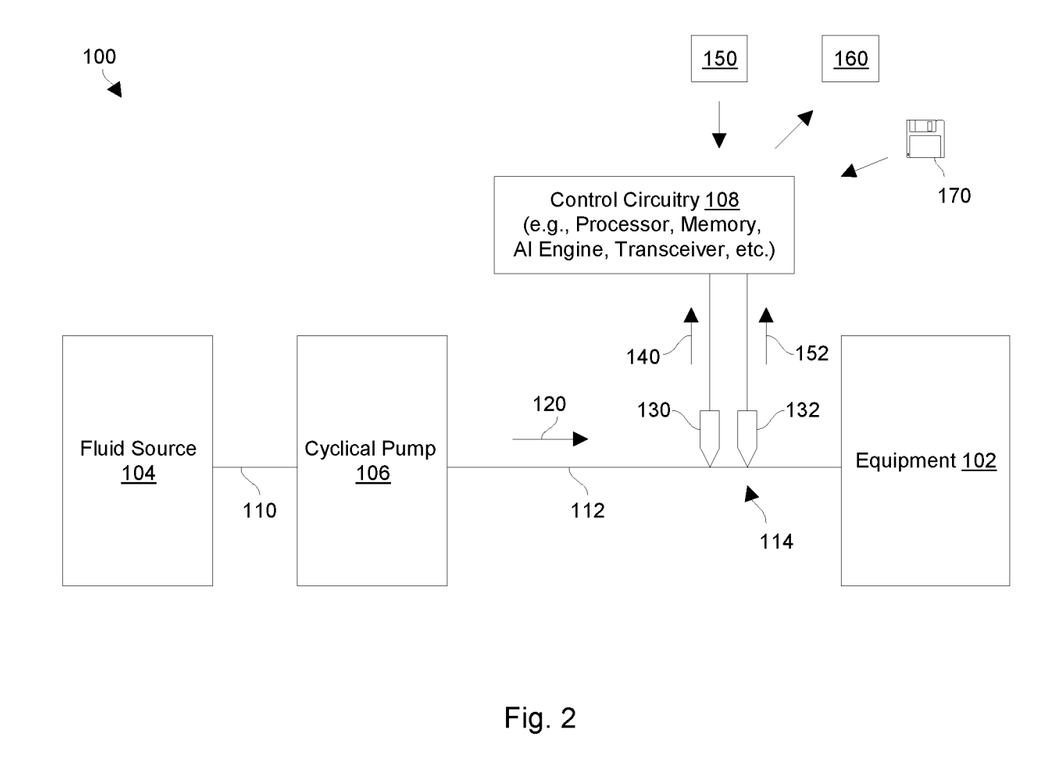
FIG. 2 is a block diagram of a safeguarding system in accordance with certain embodiments.

FIG. 2 shows a general system 100 in which equipment is safeguarded via detection of reduced cyclical pump performance. The general system 100 includes equipment 102, a fluid source 104, a cyclical pump 106, and control circuitry 108. The general system 100 further includes a fluid source line 110 that connects the fluid source 104 to the cyclical pump 106, a fluid delivery line 112 that connects the cyclical pump 106 to the equipment 102, and a set of sensors 114 to sense a set of aspects relating to cyclical pump operation.

In the aircraft example described above in connection with FIG. 1, the combination of the aircraft engine 14 and the airframe 12 (or alternatively, simply the aircraft engine 14) is an example of the equipment 102. The aircraft pump 16 is an example of the cyclical pump 106. The aircraft controller 18 is an example of the control circuitry 108.

During system operation, the cyclical pump 106 provides fluid 120 from the fluid source 104 (e.g., a tank, a reservoir, the ambient environment, etc.) to the equipment 102 through the lines 110, 112. During such operation, the cyclical pumping action produces a series of measurable pressure pulses. In the context of an aircraft such as a UAV and as explained earlier, such cyclical pumping action may result from a pump injecting oil into a 2-stroke engine that provides propulsion for the UAV.

The set of sensors 114 includes a pressure sensor 130 and a temperature sensor 132. The pressure sensor 130 senses fluid pressure provided by the cyclical pump 106 and provides fluid pressure readings 140 to the control circuitry 108. Although the pressure sensor 130 is shown as being disposed at a location along the fluid delivery line 112, other suitable locations within the system 100 include residing on or within the cyclical pump 106, on or within the equipment 102, and adjacent to or as part of the control circuitry 108.

The control circuitry 108 receives and processes the fluid pressure readings 140 from the pressure sensor 110 to determine whether the equipment 102 is being sufficiently serviced in response to operation of the cyclical pump 106. In particular, over time, the control circuitry 108 samples pressure from the pressure sensor 130 to capture and identify a current highest pressure reading and a current lowest pressure reading for each pumping action cycle. It should be appreciated that the fluid pressure varies during each pumping action cycle but, due to a high sampling frequency (e.g., over-sampling the pressure signal outputted by the pressure sensor 130), the control circuitry 108 is able to capture the maximum pressure and minimum pressure during each pumping action cycle.

Additionally, over time, the control circuitry 106 generates an amplitude signal representing amplitude of the pressure provided by the cyclical pump 104 based on the fluid pressure readings 140. In particular, for each pumping action cycle, the control circuitry 108 subtracts the current lowest pressure reading from the current highest pressure reading to obtain a current amplitude value, the amplitude signal being a series of these amplitude values over time.

Furthermore, over time, the control circuitry 108 performs comparison operations that compare the amplitude signal to a predefined threshold 150. If the amplitude signal is above the predefined threshold 150, the control circuitry 108 considers cyclical pump performance to be healthy. However, if the amplitude signal falls below the predefined threshold 150, the control circuitry 108 considers cyclical pump performance to be unhealthy, i.e., where cyclical pump performance has dropped so significantly that the control circuitry 108 must effectuate a set of remedial activities (i.e., one or more remedial actions) to safeguard the equipment 102.

In accordance with certain embodiments, the control circuitry 108 is able to make adjustments to the predefined threshold 150 over time. In some arrangements, the control circuitry 108 modifies an original predefined threshold 150 to form a new threshold 150' based on a set of factors from the set of sensors 114 such as a temperature. Along these lines, the control circuitry 108 routinely obtains temperature readings 152 indicating current fluid temperature from the temperature sensor 132. For example, in the context of oil for a 2-stroke engine for UAV propulsion, the control circuitry 108 is able to take into account oil temperature and adjust the threshold 150 accordingly. Other types of sensors and measured fluid aspects are suitable for use as well.

There are a variety of suitable remedial activities for safeguarding the equipment 102. Such activities may not only preserve the equipment 102 itself but also provide protection to humans, objects, structures, etc. in the vicinity.

In accordance with certain embodiments, the set of remedial activities involves the control circuitry 108 outputting an alert 160 to a user. For example, in the earlier-described UAV example, the controller 18 (FIG. 1) may send, as the alert 160, an alarm message to a user on the ground who is remotely piloting the UAV to enable the user to land the UAV before the UAV loses power sufficient for flight.

In accordance with certain embodiments, the set of remedial activities includes executing an automated procedure. For example, in the earlier-described UAV example, the controller 18 may perform a landing procedure to land the UAV before the UAV loses power sufficient for flight. Such a landing procedure may constructed in real time (e.g., based on positioning information (e.g., from global positioning system circuitry of the UAV), preloaded instructions (e.g., all or portions of a predefined flight plan), input from a user on the ground, combinations thereof, etc.

In accordance with certain embodiments, the control circuitry 108 is at least partially formed by processing circuitry and memory. In particular, the processing circuitry executes instructions stored in the memory to form specialized circuitry that robustly and reliably safeguards the equipment 102. Such control circuitry 108 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 170 is capable of delivering all or portions of the instructions to the control circuitry 108. In particular, the computer program product 170 has a non-transitory (or non-volatile) computer readable medium which stores a set of instructions that controls one or more operations of the control circuitry 108. Examples of suitable computer readable storage media include tangible articles of manufacture and apparatus which store instructions in a non-volatile manner such as DVD, CD-ROM, flash memory, disk memory, tape memory, and the like. Further details will be provided with reference to FIG. 3.

Figure 3:
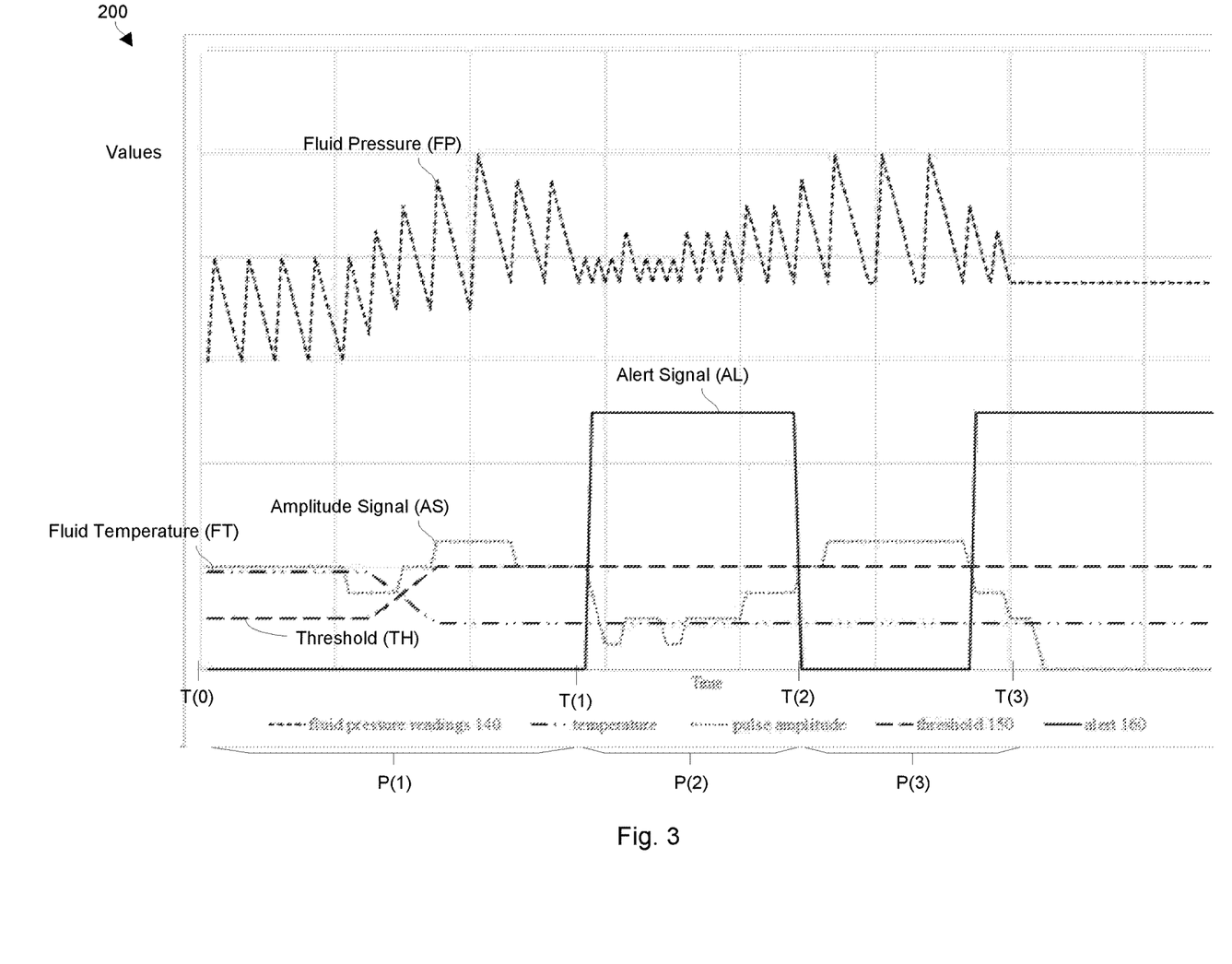
FIG. 3 is a graphical illustration of certain example details of the safeguarding system of FIG. 2 in accordance with certain embodiments.

FIG. 3 shows particular example aspects of the cyclical pump 106 that provides fluid to equipment 102 (also see FIG. 2) during an example operating time period. The X-axis indicates time. The Y-axis indicates certain values.

The top most plot in FIG. 3 represents fluid pressure (FP) at an output of the cyclical pump 106 (e.g., also see the pressure sensor 130 in FIG. 2). A second plot in FIG. 3 represents an amplitude signal (AS) generated by subtracting the lowest pressure reading from a highest pressure reading during each pumping action cycle. A third plot represents fluid temperature (FT) based on fluid temperature readings (also see the temperature signal 152 from the temperature sensor 132 in FIG. 2). A fourth plot represents a threshold (TH) which may be adjusted from an initial value based on the fluid temperature (FT) (also see the threshold 150 in FIG. 2). A fifth plot represents an alert signal (AL) that transitions from a de-asserted state to an asserted state to indicate remedial action should be performed to safeguard the equipment 102.

By way of example, suppose that the cyclical pump 106 begins healthy operation at time T(0) and continues to operate in a healthy manner to time T(1). That is, during the time period P(1) from T(0) to T(1), the cyclical pump 106 provides fluid 120 under appropriate pressure enabling the equipment 102 to operate properly.

Accordingly, as illustrated by the top most plot, the fluid pressure (FP) varies in a tight range due to the cyclical pumping action but the overall magnitude of the plot remains relatively constant during the time period P(1). Additionally, as illustrated by the second plot, the amplitude signal (AS) varies but remains consistently above the threshold (TH) defining healthy operation during the time period P(1) (also see the threshold 150 in FIG. 3).

Now, suppose at time T(1) an event occurs that jeopardizes the health of the equipment 102. Along these lines, the cyclical pump 106 may encounter an anomaly or event (e.g., a clog or bubbles in the fluid supply line 110, a puncture of the pump 106 or the fluid delivery line 112, etc.).

As illustrated by the top most plot, the overall magnitude of the fluid pressure (FP) remains relatively constant during the time period P(2) from time T(1) to T(2). However, as illustrated by the second plot, the amplitude signal (AS) falls below the threshold (TH) almost immediately after time T(1). Along these lines, the temperature sensor 132 may have provided lower temperature readings which causes the control circuitry 108 to appropriately adjust the threshold (TH) higher (also see FIG. 2).

Since the amplitude signal (AS) drops below the threshold (TH) around time T(1), the control circuitry 108 outputs an alert. In particular, the alert signal (AL) which was initially in a de-asserted state (e.g., low) transitions to the asserted state (e.g., high) to signify the alert.

Next, suppose at time T(2) a subsequent event occurs resulting in a temporary recovery of the fluid pressure. Along these lines, a blockage of the fluid 120 may have drifted further down the fluid supply line 110, a large mass of bubbles in the pump 106 may have escaped, etc.

As illustrated by the top most plot, the overall magnitude of the fluid pressure (FP) again remains relatively constant during the time period P(3) from time T(2) to T(3). Furthermore, as illustrated by the second plot, the amplitude signal (AS) rises above the threshold (TH) almost immediately after time T(2).

Finally, suppose at time T(3) the cyclical pump 106 fails outright. Along these lines, a blockage of the fluid 120 may have resulted in no further fluid 120 being delivered to the pump 106, a series of further bubbles in the pump 104 may have caused the pump 106 to completely fail, etc.

As illustrated by the top most plot, the plot of the fluid pressure (FP) flattens out after time T(3). Additionally, as illustrated by the second plot, the amplitude signal (AS) again falls below the threshold (TH) around time T(3).

In the above described example scenario, one should appreciate that simply monitoring the fluid pressure (FP) identifies pump failure at time T(3). Unfortunately, at time T(3), there may not be enough time to perform any remedial action. For example, in the context of a UAV, there may not be enough time to safely land the UAV. Accordingly, damage and injury may occur to assets on the ground and the UAV may be lost.

However, in the above described example scenario, one should further appreciate that the control circuitry 108 (FIG. 2) processes fluid pressure readings 140 to generate the amplitude signal (AS), and compares the amplitude signal (AS) to the threshold (TH). Accordingly, the control circuitry 108 is able to identify the anomaly at time T(1) when the amplitude signal (AS) first drops below the threshold (TH). As illustrated by the transition of the alert signal (AL) from low to high, such identification results in outputting of an alert (e.g., to the user, to trigger automatic execution of remedial action, combinations thereof, etc.).

Advantageously, at time T(1), there may be enough time for the control circuitry 106 to complete a set of remedial activities that safeguards the equipment 102 and/or other assets in the vicinity. For example, in the context of a UAV, there may be enough time for the control circuitry 108 to alert a user and/or safely land the UAV thus avoiding damage and injury to assets on the ground and prevent losing the UAV. Further details will now be provided with reference to FIG. 4.

Figure 4:
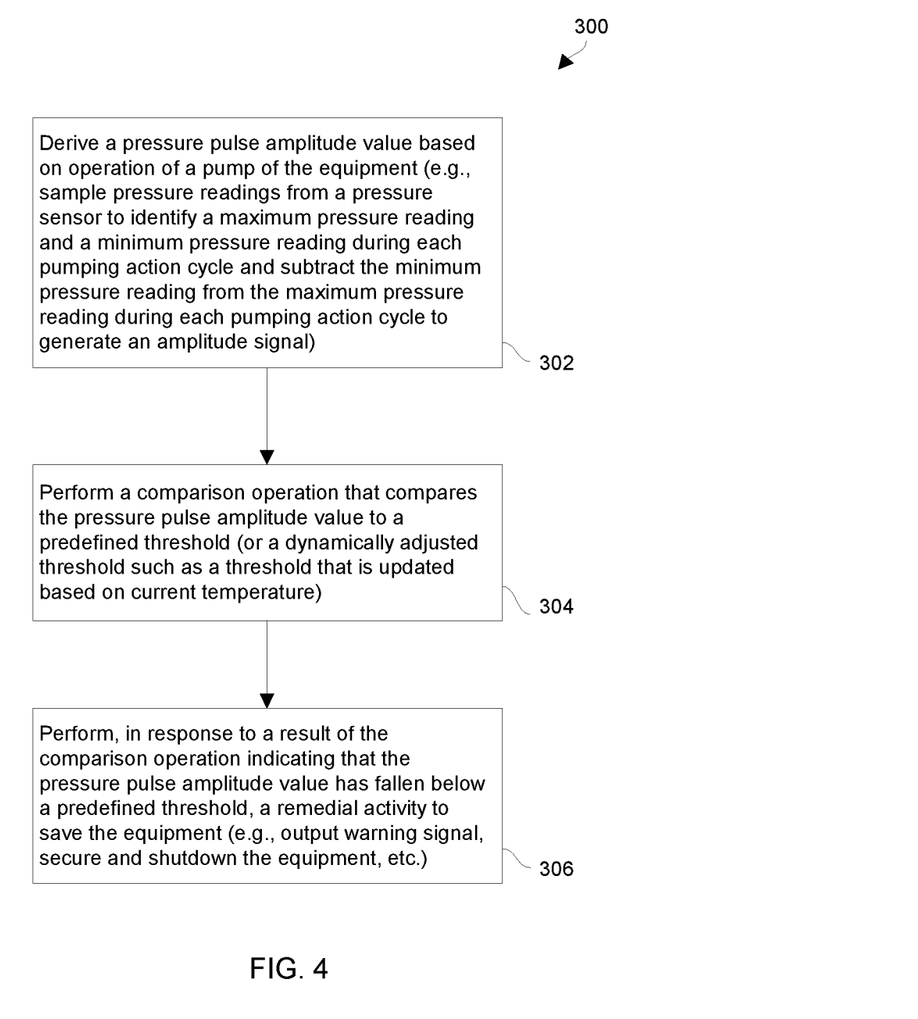
FIG. 4 is a flowchart of a procedure which is performed in accordance with certain embodiments.

FIG. 4 is a flowchart of a procedure 300 for safeguarding equipment in accordance with certain embodiments. Such a procedure may be performed by specialized circuitry (e.g., also see FIG. 2).

At 302, the specialized circuitry derives a pressure pulse amplitude value based on operation of a pump of the equipment. In some arrangements, the specialized circuitry receives pressure readings from a pressure sensor that senses pressure provided by the pump and, based on the pressure readings, generates an amplitude signal representing amplitude of the pressure provided by the pump. Along these lines, the specialized circuitry may identify a maximum pressure reading and a minimum pressure reading during each pumping action cycle, and subtract the minimum pressure reading from the maximum pressure reading during each pumping action cycle to generate the amplitude signal.

At 304 the specialized circuitry performs a comparison operation that compares the pressure pulse amplitude value to a predefined threshold. Here, the specialized circuitry may monitor the amplitude signal relative to the predefined threshold. In some embodiments, the specialized circuitry may routinely updated the threshold based on a current temperature and/or other inputs (e.g., sensor readings, commands, etc.).

At 306, the specialized circuitry performs, in response to a result of the comparison operation indicating that the pressure pulse amplitude value has fallen below the predefined threshold, a remedial activity to save the equipment. Such a remedial activity may include alert a user, securing and/or shutting down the equipment, and so on.

For example, in the context of a UAV in flight, the specialized circuitry may transmit an alert from the UAV to a user on the ground. If the user is remotely piloting the UAV, the user may have enough time to fly the UAV to a safe location and land the UAV or command the UAV to execute a predefined procedure.

As another example, the specialized circuitry may be configured to execute a predefined procedure. Along these lines, the specialized circuitry may execute a flight plan to land the UAV safely before the UAV loses power sufficient for flight, deploy a parachute, jettison unsafe cargo, etc. In some arrangements, the specialized circuitry may employ artificial intelligence (AI) to make inflight decisions and take inflight actions as at least a portion of the remedial activity.

As described above, improved techniques are directed to safeguarding equipment 102 via detection of reduced cyclical pump performance. In particular, pressure pulses from a cyclical pump 106 may be sensed and evaluated to determine whether the cyclical pump 106 is moving fluid as intended by the equipment design. Such evaluation may involve comparing pressure values identifying pulse amplitude to a predefined threshold to identify degradation of pump performance prior to a possible substantial failure. Such detection of pressure pulse amplitude decay may provide an accurate diagnosis of eventual equipment failure, but leave time for taking remedial action such as securing and/or shutting down the equipment 102 safely before the cyclical pump 106 fails outright.

It should be understood that certain aspects and features disclosed herein relate to pumps that use cyclical pumping action to pump viscous fluids. More particularly, certain improvements disclosed herein pertain to detecting reduced performance of solenoid-style pumps used in oil injection systems of 2-stroke engines to enable remedial activity prior to failure.

It should be understood that a failure of a pump such as in the case of an oil injection pump of a 2-stroke engine can lead to catastrophic and sudden equipment failure. In some cases catastrophic failure at the system level can be avoided if the pump failure is detected early enough to shut down the equipment or to perform mitigating actions. In the case of some 2-stroke engines, the engine continues to operate for a period of time after the oil pump stops. In other cases, the impact of the failure can be reduced ahead of catastrophic failure through other mitigating actions. For example, a 10 minute warning that the engine is about to fail can mean the difference between recovering an unmanned aircraft with repairable damage, and a total loss of the aircraft.

A pump with a cyclical pumping action such as a solenoid-style pump will produce pressure pulses at the pump outlet. If the pressure of the fluid at the outlet of the pump is sampled by a pressure sensor and microcontroller at a sufficiently high rate, the presence of these pressure pulses can be detected by comparing the highest and lowest pressure values during the period of the pump cycle. If less fluid flows during a pump cycle than intended, the highest and lowest pressure during that pump cycle will be closer to the same and the microcontroller can signal that a pump failure has occurred. If the volume of fluid pumped during a pump cycle is only reduced rather than stopped, the difference between the highest and lowest pressure during that cycle will also be reduced. Logic and calibration thresholds in the algorithm running on the microcontroller can recognize the reduction in pulse amplitude as a reduction in fluid flow rate and signal a warning prior to failure of the pump.

Some other pump failure detection methods may focus on determining whether the mechanical motion of the pump mechanism is occurring. Such a method would be unable to detect a failure in fluid flow due to cavitation of the pump mechanism, leaks within the pump mechanism, or exhausting the fluid being pumped. Some other pump failure detection approaches may use only a minimum pressure level to determine pump function. In the case of cyclical pumps, little or no pressure may be present between pump cycles which can lead to false positive indications from a detection approach using only minimum pressure. In contrast, certain techniques disclosed herein involve measurement of pressure pulse amplitude to detect a greater number of pump failure modes for a broader set of pump mechanism architectures.

It should be understood that a pump utilizing a piston, plunger, trochoid, or other cyclical pumping action in conjunction with valves, such as check valves, to move viscous fluids in a cyclical manner will exhibit alternating periods of fluid flow and no fluid flow corresponding to the pumping volume being emptied and filled. During periods of fluid flow, the pressure of the fluid at the outlet of the pump increases to a higher value due to the passages downstream from the pump creating resistance to the fluid flow due to the fluid viscosity. During periods of no fluid flow, the pressure of the fluid at the outlet of the pump decreases to a lower value. A pressure sensor located at the outlet of the pump and sampled at a sufficient sampling frequency by a microcontroller is used to determine pressure pulse amplitude by subtracting the lowest pressure value from the highest pressure value during a pump cycle. If the pressure pulse amplitude is less than a predetermined minimum amplitude, the microcontroller outputs a signal to indicate pump malfunction.

The pressure sensor sampling is set to a frequency fast enough to capture maximum and minimum values in pressure based upon measurement of these values during the development process and the pump cycle frequency in the target system design.

The minimum pressure pulse amplitude is determined based upon specifics of the specific target system design, and the fluid viscosity characteristics. In cases where the viscosity of the fluid being pumped changes a great deal with temperature, the minimum pressure pulse amplitude may be adjusted. In such cases a temperature sensor can be added to the system and monitored by the microcontroller in order to adjust the minimum pulse amplitude based upon the temperature of the fluid and predetermined viscosity curves for the fluid.

In accordance with certain embodiments, particular implementations involve applications where the pump must operate reliably in a critical subsystem under a broad range of temperatures and altitudes. The broad range of conditions presents a challenge associated with pump cavitation due to the change in viscosity of the fluids and the propensity to extract vapor from the fluid under low pressure conditions experienced at high altitudes.

One should appreciate that simple monitoring of the motion of a pump mechanism is not effective at detecting failure due to cavitation or leaks within the pump. One should further appreciate that monitoring for low pressure is not feasible for cyclical pumps due to low pressure occurring normally between pump cycles.

On other hand, in accordance with certain embodiments, certain improvements disclosed herein can be applied any cyclical pump used to pump viscous fluids where a pump failure can result in damage to equipment or personal injury. These might include other vehicle applications other than unmanned aircraft or medical industry applications.

In accordance with certain embodiments, particular features include:
  Oversampling the signal from a pressure sensor placed at the outlet of a cyclical pump.
  Storing a set of samples from that oversampling in memory sufficient to include at least one complete cycle of the pump.
  Determining the minimum and maximum values from that set of stored sampled.
  Determining the pulse amplitude by subtracting the minimum value from the maximum value.
  Comparing the pulse amplitude to a predefined threshold to determine if pump function is adequate.
  Providing a warning if the pump function is not adequate.
  Optionally depending on the fluid and environment that the equipment must be used in:
    Sampling a temperature sensor place in the fluid being pumped.
    Adjusting the threshold that pulse amplitude should be according to the temperature of the fluid.

In accordance with some embodiments, the optional feature is provided in cases where the viscosity of the fluid changes within the environment. Changes in viscosity will change the pulse amplitude. Such modifications and enhancements are intended to belong to various embodiments of the disclosure.

While various embodiments of the present disclosure have been particularly shown and described, it will be understood by those skilled in the art that various changes in form and details may be made therein without departing from the spirit and scope of the present disclosure as defined by the appended claims. Such modifications and enhancements are intended to belong to various embodiments of the disclosure.

What is claimed is:

1. A method of safeguarding equipment, comprising:
    deriving a pressure pulse amplitude value based on operation of a pump of the equipment;
    performing a comparison operation that compares the pressure pulse amplitude value to a predefined threshold; and
    in response to a result of the comparison operation indicating that the pressure pulse amplitude value has fallen below the predefined threshold, performing a remedial activity to save the equipment;
    wherein the equipment is an unmanned aerial vehicle (UAV);
    wherein the pump is an oil injection pump for a 2-stroke engine of the UAV, the 2-stroke engine being constructed and arranged to drive a propeller for UAV flight;
    wherein the operation of the pump produces a pressure pulse at an outlet of the pump during a pumping action cycle of the pump;
    wherein the method further comprises:
      sampling pressure readings at the outlet of the pump during the pumping action cycle; and
    wherein deriving a pressure pulse amplitude value includes:
      calculating the pressure pulse amplitude value based on the pressure readings by subtracting a lowest pressure value of the pressure readings from a highest pressure value of the pressure readings, the pressure pulse amplitude value indicating a fluid flow rate during the pumping action cycle.

2. A method as in claim 1 wherein deriving the pressure pulse amplitude value based on operation of the pump includes:
    receiving the pressure readings from a pressure sensor that senses pressure provided by the pump, and
    based on the pressure readings, generating an amplitude signal representing amplitude of the pressure provided by the pump.

3. A method as in claim 2 wherein the pump is constructed and arranged to provide a cyclical pumping action to produce a series of pressure pulses; and
    wherein receiving the pressure readings from the pressure sensor includes sampling readings from the pressure sensor at a frequency that captures a maximum pressure reading and a minimum pressure reading during each pumping action cycle.

4. A method as in claim 3 wherein generating the amplitude signal representing amplitude of the pressure provided by the pump includes:
    subtracting a lowest pressure reading from a highest pressure reading during each pumping action cycle to provide the amplitude signal.

5. A method as in claim 1 wherein performing the remedial activity to save the equipment includes:
    outputting an alert to a user remotely piloting the UAV to enable the user to land the UAV before the UAV loses power sufficient for flight.

6. A method as in claim 1 wherein performing the remedial activity to save the equipment includes:
    executing an automated landing procedure to land the UAV before the UAV loses power sufficient for flight.

7. A method as in claim 1, further comprising:
    prior to performing the comparison operation, performing a threshold adjustment operation that modifies an original threshold to form the predefined threshold, the threshold adjustment operating being based on a current oil temperature value obtained from a temperature sensor.

8. A method as in claim 1, wherein deriving the pressure pulse amplitude value based on operation of the pump includes:
    ascertaining the pressure pulse amplitude value based on a set of pressure readings while the pump provides oil to the 2-stroke engine to support driving the propeller to provide thrust for UAV flight.

9. A method as in claim 1 wherein performing the remedial activity includes:
  continuing to operate the pump during a safeguarding operation that safeguards the UAV.

10. A method as in claim 1 wherein performing the remedial activity includes:
  after receiving the result of the comparison operation, (i) operating the 2-stroke engine to drive the propeller to provide thrust to the UAV and (ii) flying the UAV to a landing location and executing a landing procedure to land the UAV.

11. An aircraft, comprising:
  an airframe;
  an engine mounted to the airframe to provide thrust for aircraft flight;
  a pump coupled with the engine; and
  a controller coupled with the pump, the controller being constructed and arranged to:
    derive a pressure pulse amplitude value based on operation of the pump,
    perform a comparison operation that compares the pressure pulse amplitude value to a predefined threshold, and
    in response to a result of the comparison operation indicating that the pressure pulse amplitude value has fallen below the predefined threshold, perform a remedial activity to save the aircraft while the aircraft is in flight;
  wherein the aircraft is an unmanned aerial vehicle (UAV); and
  wherein the pump is an oil injection pump for a 2-stroke engine of the UAV, the 2-stroke engine being constructed and arranged to drive a propeller for UAV flight;
  wherein the operation of the pump produces a pressure pulse at an outlet of the pump during a pumping action cycle of the pump;
  wherein the method further comprises:
    sampling pressure readings at the outlet of the pump during the pumping action cycle; and
  wherein deriving a pressure pulse amplitude value includes:
    calculating the pressure pulse amplitude value based on the pressure readings by subtracting a lowest pressure value of the pressure readings from a highest pressure value of the pressure readings, the pressure pulse amplitude value indicating a fluid flow rate during the pumping action cycle.

12. An aircraft as in claim 11 wherein the controller, when deriving the pressure pulse amplitude value based on operation of the pump, is constructed and arranged to:
  receive the pressure readings from a pressure sensor that senses pressure provided by the pump, and
  based on the pressure readings, generate an amplitude signal representing amplitude of the pressure provided by the pump.

13. An aircraft as in claim 12 wherein the pump is constructed and arranged to provide a cyclical pumping action to produce a series of pressure pulses; and
  wherein the controller, when receiving the pressure readings from the pressure sensor, is constructed and arranged to:
    sample readings from the pressure sensor at a frequency that captures a maximum pressure reading and a minimum pressure reading during each pumping action cycle.

14. An aircraft as in claim 13 wherein the controller, when generating the amplitude signal representing amplitude of the pressure provided by the pump, is constructed and arranged to:
  subtract a lowest pressure reading from a highest pressure reading during each pumping action cycle to provide the amplitude signal.

15. An aircraft as in claim 11 wherein the controller, when performing the remedial activity to save the aircraft, is constructed and arranged to:
  output an alert to a user remotely piloting the UAV to enable the user to land the UAV before the UAV loses power sufficient for flight.

16. An aircraft as in claim 11 wherein the controller, when performing the remedial activity to save the aircraft, is constructed and arranged to:
  execute an automated landing procedure to land the UAV before the UAV loses power sufficient for flight.

17. An aircraft as in claim 11 wherein the controller is further constructed and arranged to:
  prior to performing the comparison operation, perform a threshold adjustment operation that modifies an original threshold to form the predefined threshold, the threshold adjustment operating being based on a current oil temperature value obtained from a temperature sensor.

18. Electronic circuitry to safeguard equipment, the electronic circuitry comprising:
  memory; and
  control circuitry coupled to the memory, the memory storing instructions which, when carried out by the control circuitry, cause the control circuitry to:
    derive a pressure pulse amplitude value based on operation of a pump of the equipment,
    perform a comparison operation that compares the pressure pulse amplitude value to a predefined threshold, and
    in response to a result of the comparison operation indicating that the pressure pulse amplitude value has fallen below the predefined threshold, perform a remedial activity to save the equipment;
  wherein the equipment is an unmanned aerial vehicle (UAV); and
  wherein the pump is an oil injection pump for a 2-stroke engine of the UAV, the 2-stroke engine being constructed and arranged to drive a propeller for UAV flight;
  wherein the operation of the pump produces a pressure pulse at an outlet of the pump during a pumping action cycle of the pump;
  wherein the method further comprises:
    sampling pressure readings at the outlet of the pump during the pumping action cycle; and
  wherein deriving a pressure pulse amplitude value includes:
    calculating the pressure pulse amplitude value based on the pressure readings by subtracting a lowest pressure value of the pressure readings from a highest pressure value of the pressure readings, the pressure pulse amplitude value indicating a fluid flow rate during the pumping action cycle.

19. Electronic circuitry as in claim 18 wherein the control circuitry, when deriving the pressure pulse amplitude value based on operation of the pump, is constructed and arranged to:
  receive the pressure readings from a pressure sensor that senses pressure provided by the pump, and
  based on the pressure readings, generate an amplitude signal representing amplitude of the pressure provided by the pump.

20. Electronic circuitry as in claim 19 wherein the controller, when generating the amplitude signal, is constructed and arranged to:
  from sampled readings from the pressure sensor at a frequency that captures a series of pressure readings during each pumping action cycle, identify a current highest pressure reading and a current lowest pressure reading for each pumping action cycle, and
  subtracting the current lowest pressure reading from the highest pressure reading for each pumping action cycle to provide the amplitude signal.

21. A computer program product having a non-transitory computer readable medium which stores a set of instructions to safeguard equipment; the set of instructions, when carried out by computerized circuitry, causing the computerized circuitry to perform a method of:
  deriving a pressure value based on operation of a pump of the equipment;
  performing a comparison operation that compares the pressure value to a predefined threshold; and
  in response to a result of the comparison operation indicating that the pressure value has fallen below the predefined threshold, performing a remedial activity to save the equipment;
  wherein the equipment is an unmanned aerial vehicle (UAV); and
  wherein the pump is an oil injection pump for a 2-stroke engine of the UAV, the 2-stroke engine being constructed and arranged to drive propeller for UAV flight;
  wherein the operation of the pump produces a pressure pulse at an outlet of the pump during a pumping action cycle of the pump;
  wherein the method further comprises:
    sampling pressure readings at the outlet of the pump during the pumping action cycle; and
  wherein deriving a pressure pulse amplitude value includes:
  calculating the pressure pulse amplitude value based on the pressure readings by subtracting a lowest pressure value of the pressure readings from a highest pressure value of the pressure readings, the pressure pulse amplitude value indicating a fluid flow rate during the pumping action cycle.

* * * * *